(No Model.)
S. FINK.
Combined Ash Pan and Sifter.
No. 228,749. Patented June 15, 1880.
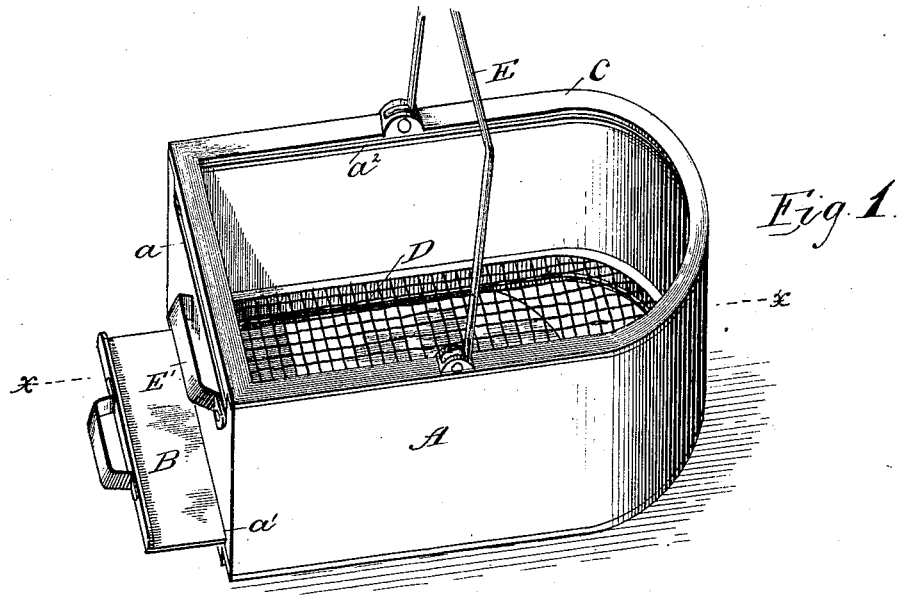
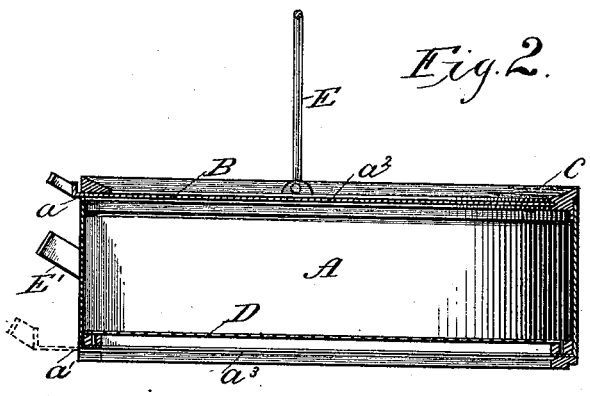
Witnesses.
Inventor:
Simon Fink.

UNITED STATES PATENT OFFICE.

SIMON FINK, OF MILWAUKEE, WISCONSIN.

COMBINED ASH PAN AND SIFTER.

SPECIFICATION forming part of Letters Patent No. 228,749, dated June 15, 1880.

Application filed March 8, 1880. (No model.)

*To all whom it may concern:*

Be it known that I, SIMON FINK, of Milwaukee, in the county of Milwaukee, and in the State of Wisconsin, having invented certain new and useful Improvements in Combined Ash Pans and Sifters; and I do hereby declare that the following is a full, clear, and exact description thereof.

My invention relates to stove attachments; and it consists in a device which combines the functions of an ash pan and sifter, as will hereinafter be fully described.

In the drawings, Figure 1 represents my device in perspective, and Fig. 2 is a section on line $x\,x$, Fig. 1.

A is the body of my device, which may be of any desired shape. B is a sliding cover, made to fit in the recesses $a\,a'$ and grooves $a^2\,a^3$. C is the rim, which may be slightly beveled inward, and D is a bottom of wire interwoven, as in sieves generally. The sliding cover is provided with a suitable handle, and the pan with a bail, E, and handle E'.

When my device is to be used as an ash-pan the sliding cover is placed in the lower groove, $a'$, the bail E turned down upon the rim, and it is placed in the bottom of the stove to catch the ashes and bits of coal as they fall through the grate. When it is filled it is converted into a sifter by withdrawing the sliding cover B from below the sieve and placing it above, as shown in Fig. 2. Then, holding onto the handles by one hand and the bail by the other, the device may be shaken until all of the ashes have passed through, the unconsumed coal remaining. The sliding cover will prevent the rising of ashes from the pan during the shaking.

The operation of transferring the ashes from the pan to sifter as heretofore has been so disagreeable that, in preference to going through with it, a great many people submit to the loss of unconsumed fuel; but by my invention it will be fully as easy to sift the ashes out as to empty an ordinary ash-pan.

My device may be made wholly of sheet metal, or partly of sheet and partly of cast metal.

I am aware that a coal-scuttle has been provided with a sieve and a removable bottom, and such I do not claim; but What I do claim as my invention, and desire to secure by Letters Patent, is—

An ash-pan having a sieve in its bottom and the grooves $a^2\,a^3$, in combination with the sliding cover adapted to fit into said grooves, as set forth.

In testimony that I claim the foregoing I have hereunto set my hand this 4th day of March, 1880.

SIMON FINK.

Witnesses:
S. S. STOUT,
J. B. STEMPER.